May 19, 1970 M. E. AUGER, JR 3,513,328

PULSE GENERATING CIRCUIT UTILIZING AVALANCHE FIRING OF SERIES CONNECTED SCRS

Filed May 6, 1968 2 Sheets-Sheet 1

INVENTOR
MEDERIC E. AUGER, JR.

BY W. C. Crutcher

ATTORNEY

INVENTOR
MEDERIC E. AUGER, JR.
BY W. C. Crutcher
ATTORNEY 3,513,328
PULSE GENERATING CIRCUIT UTILIZING AVALANCHE FIRING OF SERIES CONNECTED SCR'S Mederic E. Auger, Jr., Schenectady, N.Y., assignor to General Electric Company, a corporation of New York Filed May 6, 1968, Ser. No. 726,666
Int. Cl. H03k 17/72
U.S. Cl. 307—108 4 Claims

ABSTRACT OF THE DISCLOSURE

A pulse generating circuit for production of high-energy pulses suitable for use in applications such as radar modulators, linear accelerator modulators and ultrasonic testing includes a high voltage source, a load impedance across which the pulse is to be developed, energy storage elements such as a capacitor, a charging resistor coupling the capacitor to the high voltage source and a switching circuit including a plurality of SCR's for completing a discharge circuit through the load impedance and capacitor upon closure. One or a number of the SCR's are fired by conventional gate triggering, and the remainder are placed into a conducting conditon by forward avalanche breakdown whereby the initial waveshape of the pulse developed across the load impedance has a fast rise time and a high peak magnitude. The subsequent shape of the pulse depends on the load impedance used, and examples including a resistor, a coaxial cable and an L-C network are illustrated.

BACKGROUND OF THE INVENTION

This invention relates generaly to pulse-generating circuits and, more particularly, to means for producing a high energy pulse of high peak magnitude and a fast rise time.

In applications such as radar modulators, linear accelerator modulators, and electrostrictive transducers for ultrasonic testing, high-energy pulses having a high peak magnitude and a fast rise time are required. Generally, pulse-generating circuits for such applications have comprised a high voltage source, means coupling the high voltage source to both an energy storage means and to a switching means, and a load impedance connected in circuit relation with the energy storage means. Initially, the switching means is open and the energy storage means is charged by the high voltage source through the coupling means. Upon closure of the switching means, the energy storage means discharges, thereby producing a pusle in the load impedance.

The general shape of the pulse obtained can be varied by choice of the particular energy storage means and load impedance used. For instance, it is common to use as the energy storage means a pulse forming network comprising discrete inductors and capacitors or a continuous set of distributed inductors or capacitors, such as a length of coaxial cable of a given characteristic impedance, to produce a single pulse of essentially constant width. On the other hand, dampened, oscillatory pulses can be obtained if the energy storage means comprises a capacitor and the load impedance comprises an inductive-capacitive network.

In previous high-energy pulse-generating circuits, the switching means usually comprised a gaseous discharge tube, such as a thyratron. Although thyratrons performed satisfactorily, they were found to have a limited life expectancy. In more recent years, the switching means has comprised one or more semiconductor devices, such as a transistor, a four-layer breakdown diode or an avalanche transistor. Each of these semiconductor devices has achieved either one or both of the requirements of high peak pulse magnitude and fast rise time, but in high energy applications their usage has been limited because of certain deficiencies.

To better understand these limitations, reference must be made to the mechanics of pulse formation in a generalized pulse-generating circuit, such as that illustrated in FIG. 1. Assuming that the energy storage means comprises a single capacitor $C_C$ and that the load impedance is an impedance $Z_L$, the peak magnitude of any pulse produced thereby is the peak voltage developed across the resistance upon discharge of the capacitor. The peak voltage is in turn proportional to the peak discharge current through the pulse-generating circuit. In FIG. 1, both a switching means S having a trigger input T and the impedance $Z_L$ are coupled to a source of reference potential, such as ground, and a high voltage source V is isolated from the switching means S and the energy storage means $C_C$ by a high impedance $Z_C$ in the coupling means so that current flow thereto in the short discharge time experienced is negligible. Under these conditions, discharge current flows upon closure of the switching means S by application of a signal to input T through the series circuit of the impedance $Z_L$, the capacitor $C_C$, and the switching means S. Now, since the voltage across a capacitor cannot change instantaneously, if the switching means S can close instantaneously, the entire voltage on the capacitor $C_C$ due to the presence of stored charge will be impressed across the impedance $Z_L$. Simultaneously, the current therethrough rises to a value determined by the resistance value. Therefore, the peak voltage is that present on the capacitor $C_C$. Of course, the peak discharge current must not exceed the peak current limitation of the switching means. This factor becomes important when discharge current requirements exceed the capabilities of known switching devices of a given class. Therefore, even if the switching means S could close instantaneously, the peak pulse voltage may be limited by the switching means chosen.

A much more likely case is that where the switching means S does not close instantaneously. If the switching means S takes a finite time to completely close, charge may leak off the capacitor $C_C$ during this finite time through the partially-conducting paths of the switching means S. The amount of charge lost is a function of this finite time and of the varying impedance of the discharge paths through the switching means S; the discharge current therefore is limited below the value obtained had the switching means S closed instantaneously. The difference in discharge currents depends on the size of the capacitor or its ability to supply a given amount of charge in a given time period, but in any case the peak pulse voltage is lowered. By the same reasoning, the finite switching time also determines the rise time of the resultant pulse, for the peak discharge current cannot be reached until a point in time when the switching means has completely closed.

Thus, the peak pulse magnitude is dependent upon the current-carrying capacity of the switching means S. Moreover, in the usual case where the switching means S does not completely close instantaneously, peak pulse magnitude and the pulse rise time are limited by the finite switching time thereof. Similar considerations govern where the load impedance also includes energy storage elements. In such cases, the total amount of charge which is stored in the elements of the load impedance and in the energy storage means, if any, at the time when the switching means is completely closed is a more important parameter than the discharge current. This charge is dependent upon both switching time and upon the initial amount of charge able to be stored in the elements and the energy storage means. As semiconductor devices have a forward breakover voltage of a given value, the voltage impressed across the elements and the energy storage means by the high voltage source during charging must be limited below this value.

Now applying this discussion to the prior art, an illustrative example may be taken from those circuits which utilize an avalanche transistor as the switching means. A single avalanche transistor may be triggered by application of a suitable voltage to the base-emitter junction thereof so that conduction between the collector and emitter occurs rather rapidly to thereby provide a pulse of extremely fast rise time. However, the maximum discharge current is limited to the maximum collector current of the transistor; moreover, the maximum voltage able to be impressed across the capacitor must be below the breakover voltage of the transistor.

To alleviate the breakover voltage problem, it has been proposed to connect a plurality of avalanche transistors in a series circuit arrangement, with the base-to-emitter junctions of each transistor except the first in the circuit being shorted. Upon firing the first transistor of the series, the remaining transistors breakdown because of avalanching in their individual collector-to-base junctions. However, as with the single avalanche transistor, the discharge current of this series circuit is limited to the maximum collector current of each transistor. For this reason, avalanche transistors had found acceptance only in pulse-generating circuits for logic circuits and other low-energy applications.

To obtain larger discharge currents, the use of silicon controlled rectifiers as the switching means has been proposed. The silicon controlled rectifier, or SCR, may be placed into a conducting condition by application of a current pulse to its gate electrode from a trigger circuit connected thereto. Compared with the avalanche transistor, the SCR has advantages of greater temperature stability and greater ability to carry a larger current for a longer period of time. Therefore, the peak discharge current may be greatly increased. However, as with the single avalanche transistor, the forward blocking voltage capability of an SCR limits the amplitude of the source voltage.

The forward breakover voltage problem may be solved by connecting a plurality of SCRs in a series circuit arrangement. However, the relatively slow switching times associated with gate firing in SCRs are magnified when a number of SCRs are used, thus resulting in a severe limitation on the peak discharge current by requiring a finite time for the switching means to completely close.

One circuit in which this limitation is clearly illustrated is that utilizing "sympathetic firing" in which the first of a number of SCRs in the series arrangement is fired by application of a pulse from an external trigger circuit to the gate thereof. By connection of the anode of that and succeeding SCRs to the gate electrode of the adjacent SCR, each SCR can be fired in turn. Although this circuit allows firing of all SCRs by means of a single trigger pulse, the rise time and peak magnitude of the pulse obtained is adversely affected by the cumulative effects of gate turn on of each SCR.

It has been proposed to connect the gate electrode of each SCR in the series arrangement to a corresponding secondary of a pulse transformer whose single primary is coupled to an external trigger circuit. The trigger circuit supplies a pulse of very high magnitude and extremely short duration; to insure that each SCR is fired at the same instant, a voltage regulating means, such as a Zener diode, is disposed across each secondary winding. Moreover, a voltage maintaining means, such as a capacitor, is connected across the conducting electrodes of each SCR so an equal voltage is present across each SCR. Although the switching times of this circuit have been generally comparable to those obtainable with circuits utilizing a single SCR, the rise time and peak discharge current remain limited to those obtainable from a single SCR fired by gate triggering. Also, the additional components included have both reduced reliability and increased cost.

SUMMARY OF THE INVENTION

It is therefore an object of this invention to provide a semiconductor switching means for a high-energy, pulse-generating circuit which can produce a pulse of high peak magnitude and a steep waveform or fast rise time.

It is a further object of this invention to provide a semiconductor switching means for such a pulse-generating circuit which utilizes a plurality of silicon controlled rectifiers to produce a pulse whose characteristics are not limited by slow gate triggering of the rectifiers.

It is yet a further object of this invention to provide a semiconductor switching means utilizing a plurality of silicon controlled rectifiers which requires a minimum of additional components to those included in a pulse-generating circuit utilizing a single SCR.

These objects are achieved, according to one embodiment of the invention, by providing a conventional gate-firing circuit for one or more of the SCRs in the series arrangement, then utilizing forward avalanche breakdown in the remaining SCRs whereby the fast switching times for the switching means to completely close are obtained.

BRIEF DESCRIPTION OF THE DRAWINGS

The subject matter of the invention is particularly pointed out and distinctly claimed in the concluding portion of the specification. For a complete understanding of one embodiment of the invention together with further objects and advantages thereof, reference should be made to the following description taken in conjunction with the accompanying drawings in which:

DESCRIPTION OF A PREFERRED EMBODIMENT

Figures 1, 2, 3:
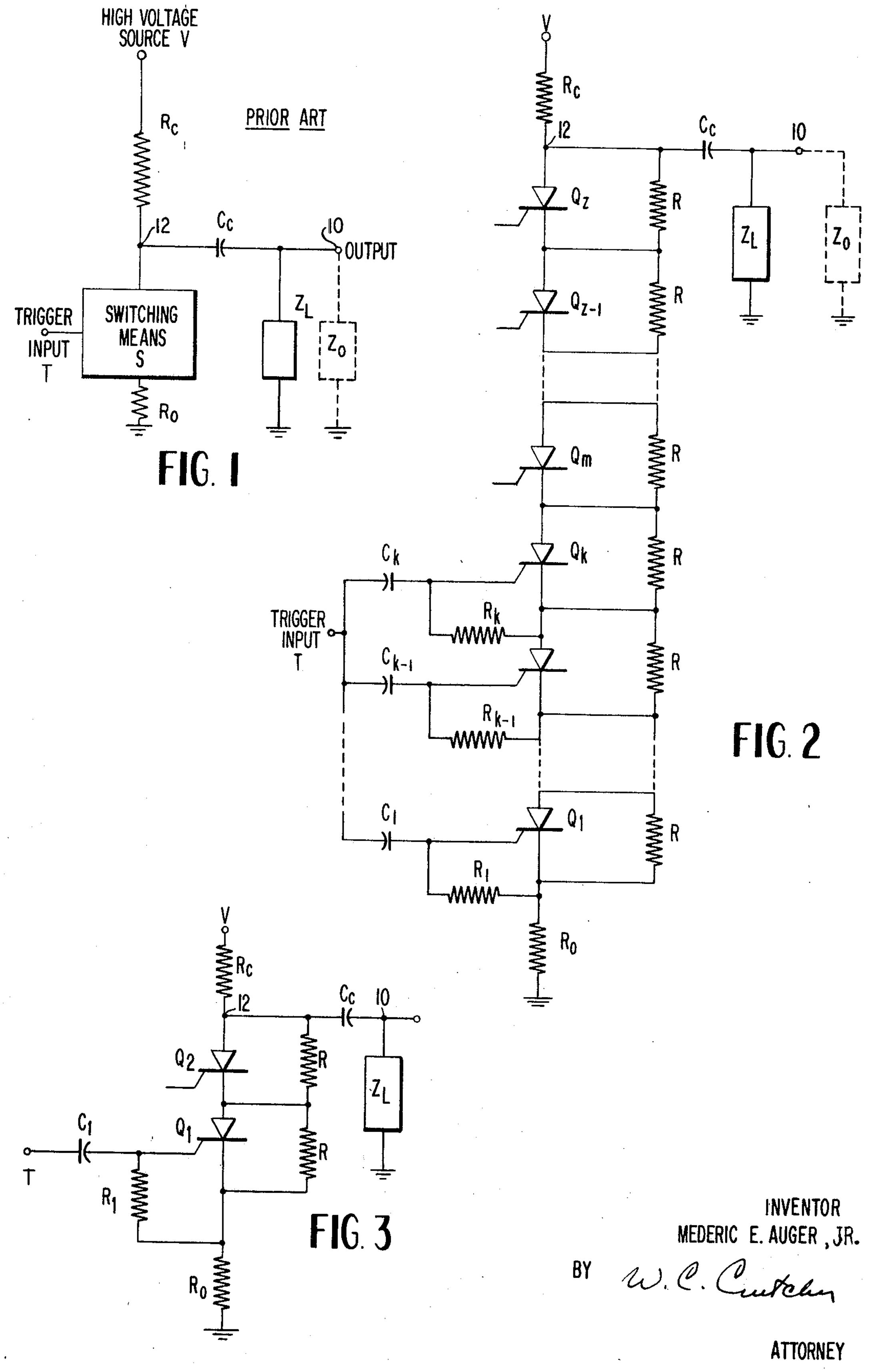
FIG. 1 is a schematic diagram of a generalized pulse-generating circuit found in the prior art.
FIG. 2 is a schematic diagram of the pulse-generating circuit of this invention.
FIG. 3 is a schematic diagram of one practical embodiment of this invention.

Now referring to FIG. 1, a pulse-generating circuit includes a load $Z_L$ having one end connected to a source of reference potential, such as ground. The circuitry comprising $Y_L$ depends upon the type of pulse required and reference to specific embodiments will be made later. The other side of $Z_L$ is connected to one terminal 10 of an energy storage means, such as a series capacitor $C_C$. In turn, the other terminal of $C_C$ is connected to a common point 12 between a switching means S, and means coupling a high voltage D.C. supply V, thereto. Included in the coupling means is a charging resistor $R_C$. Switching means S is capable of coupling the common point 12 to a source of reference potential, such as ground, through a limiting resistor $R_O$ upon application of a pulse to a triggered input terminal T thereof.

Initially, assume that switching means S has been maintained in an open condition for a relatively long period of time. During this period, series capacitor $C_C$ and any reactive elements in impedance $Z_L$ have been charged by the voltage supply V through charging resistor $R_C$. The rate of charging is determined by the values of $R_C$, $C_C$, and $Z_L$. At the end of this period, the voltage due to stored charge which appears across capacitor $C_C$ and any reactive elements in the impedance $Z_L$ is approximately equal to the voltage V.

An output may be taken from the common point 10 of $C_C$ and $Z_L$. In normal operation, the output impedance presented to this common point is that of the ensuing circuitry utilizing the pulse produced in discharging $C_C$. This additional impedance, both reactive and resistive, can be designated as $Z_O$ connected between the common point 10 and ground potential. When a signal is applied to trigger input terminal T, switching means S closes and provides a discharge path for the charge stored in series capacitor $C_C$ and impedance $Z_L$ or combination of $Z_L$ and $Z_O$. The total discharge current flow is through the switching means S to produce a voltage pulse at the common point 10 whose characteristics are largely determined by the circuitry comprising $Z_L$ or $Z_L$ and $Z_O$.

Referring now to FIG. 2, in accordance with the teachings of this invention, switching means S comprises a plurality of series-connected SCRs $Q_1$ through $Q_Z$. To obviate the difficulties of prior semiconductor switching means, the invention contemplates initiation of conduction through a portion of the SCRs in the series arrangement by conventional gate triggering to thereafter produce an avalanche condition in the remaining SCRs. As the switching times obtainable with avalanche breakdown are extremely small, the peak pulse magnitude obtainable across the impedance $Z_L$ can be made larger than heretofore known; in addition, the rise times obtained are very fast, in the order of 25 nanoseconds.

Connected between the cathode and anode of each SCR $Q_1$ through $Q_Z$ is a resistor R, which maintains the voltage across each SCR to a value less than the avalanche voltage. Of the SCRs $Q_1$ through $Q_Z$, SCRs $Q_1$ through $Q_K$ are fired by conventional gate triggering. This triggering may comprise coupling a trigger signal to trigger input T from any pulse-forming circuit well known to the art, such as those circuits utilizing unijunction transistors, bilateral semiconductor switches (Diac), silicon unilateral switches (SUS), or silicon bilateral switches (SBS). A full discussion of these pulse-forming circuits can be found in the General Electric SCR Manual, 4th ed., 1967, section 4.14, pp. 73–82.

Coupling the trigger input T to the gate electrode of each SCR $Q_1$ through $Q_K$ is a plurality of capacitors $C_1$ through $C_K$. Finally, a plurality of resistors $R_1$ through $R_K$ are disposed between the gate and cathode electrodes of each SCR $Q_1$ through $Q_K$.

The remaining SCRs $Q_M$ through $K_Z$ have no connection whatsoever to their gate electrodes.

An essential condition for non-conduction of the SCRs $Q_1$ through $Q_Z$ illustrated in FIG. 2 is that the voltage impressed across each after the energy storage means including capacitor $C_C$ and impedance $Z_L$ has been charged is that the voltage across each SCR is less than its forward breakover or avalanche voltage. To insure that this condition is met, the resistors R distribute the supply voltage equally across each SCR.

To place the switching means S in a fully closed or conducting condition, forward avalanche breakdown is utilized in SCRs $Q_M$ through $Q_Z$ of the series arrangement. The phenomenon of avalanche breakdown is fully described in Semiconductor Controlled Rectifiers by Gentry et al., Prentice-Hall, 1964, p. 94, and reference should be made thereto. To place SCRs $Q_M$ through $Q_Z$ in a condition where forward avalanche breakdown can occur, SCRs $Q_1$ through $Q_K$ must first be placed in a conducting condition by gate triggering. The effect then produced is that the voltage across at least one and preferably each of SCRs $Q_M$ through $Q_Z$ is greater than the forward blocking voltage, thereby causing forward avalanche breakdown in each SCR to initiate total conduction through the series arrangement whereby the energy storage means may be discharged and a pulse produced across load impedance $Z_L$.

To assure correct and reliable operation of the switching means S, it is preferable that each of the SCRs in the series circuit be an identical or equivalent type. In this case, each of the resistors R should be of equal value. Then, two criteria for proper operation can be set out:

(a) The avalanche voltage of each SCR must be lower than $V/q$, where $q$ is the total number of SCR's from $Q_M$ to $Q_Z$ and V is the supply voltage value;

(b) The avalanche voltage of each SCR must be higher than $V/r$, where $r$ is the total number of SCRs from $Q_1$ to $Q_Z$.

By satisfaction of criterion (a), forward avalanche breakdown can be assured in each of the SCRs $Q_M$ through $Q_Z$. By satisfaction of criterion (b), forward avalanche breakdown can be prevented in each of the SCRs $Q_1$ through $Q_Z$ when $Q_1$ through $Q_K$ have not been turned on by gate triggering.

Although the embodiment illustrated uses gate triggering, the pulse produced thereby is not adversely affected by cumulative effects of slow gate firing of multiple SCRs. Generally, initiation of full conduction through SCRs $Q_1$ through $Q_K$ occurs at approximately the same time, if triggering is accomplished by a large single input pulse or a plurality of pulses applied to trigger terminal T. From this standpoint, it is preferable that as small a number of SCRs $Q_1$ through $Q_K$ be used as is consistent with pulse requirements and criteria (*a*) and (*b*). By gate triggering, full conduction through SCRs $Q_1$ through $Q_K$ takes approximately 0.5 to 1 microsecond. During this time, charge leaks from capacitor $C_C$ through resistors R and the variously-conducting paths of SCRs $Q_1$ through $Q_K$. This leakage of charge reduces the amount of charge stored in the energy storage means and thus reduces the voltage thereacross, but does not produce any appreciable pulse voltage, as only a small current flows through the resistive elements of impedance $Z_L$. Moreover, any appreciable discharge current is blocked by the high impedance of the resistors R connected across SCRs $Q_M$ through $Q_Z$. When the voltages across $Q_M$ through $Q_Z$ are such that avalanche can occur, the current therethrough increases rapidly at a rate limited only by the avalanche switching times of all the SCRs $Q_M$ through $Q_Z$ and the value of resistor $R_O$. The resultant pulse has an extremely fast rise time and a high peak magnitude compared to that obtained when all SCRs are turned on by conventional gate triggering.

Now, considering the remaining components of the pulse generating circuit illustrated in FIG. 2, the value for charging resistor $R_C$ must be chosen in light of the following:

(a) $R_C$, in combination with capacitor $C_C$ and impedance $Z_L$, determines the charging time of the energy storage means. Thus, in applications where a high pulse repetition rate is required, the value of $R_C$ must be chosen to provide recharge of the energy storage means before switching means S is closed again.

(b) More important, the value of $R_C$ determines the steady state current which can flow through the SCR's $Q_1$ through $Q_Z$. This steady state current must be below the holding current of at least one individual SCR, so that the switching means S can be permitted to reopen after discharge and recharge of the energy storage means.

The value of limiting resistor $R_O$ must be chosen, in conjunction with voltage supply V and the capacitance of $C_C$ to limit the maximum discharge current through SCR's $Q_I$ through $Q_Z$ to a value within the current capacity of each SCR.

Load impedance $Z_L$ may comprise a number of circular configurations, depending on the nature of the pulse to be produced. The initial shape of the pulses is largely determined by the switching means used; the waveform thereafter is determined by the load impedance $Z_L$ or $Z_L$ and the output impedance $Z_O$. Thus, $Z_L$ or $Z_L$ and $Z_O$ may comprise a simple resistive load for the production of an exponentially decaying pulse, an L-C network for the production of an oscillatory pulse, and a combination of discrete inductors or capacitors or a set of distributed inductances and capacitances, such as a coaxial cable, for the production of a square pulse.

Figure 5:
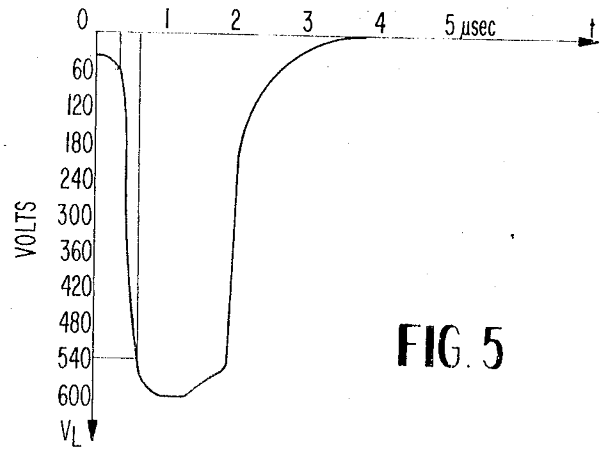
Figure 6:
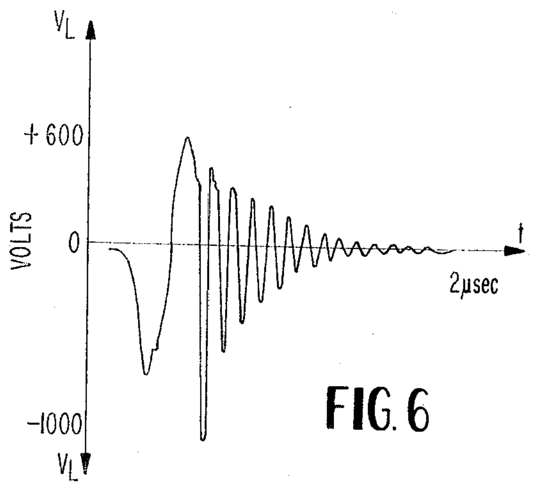

For a practical example of the embodiment illustrated in FIG. 2, two identical SCR's were connected in a test setup, wherein one of the SCR's was triggered by conventional gate triggering and the other was placed in a conducting condition by avalanche breakdown according to the teachings of this invention. This circuit is illustrated in FIG. 3. The following tabulation illustrates the values used in the test setup for the various components of FIG. 3:

V—1.3 kv.
$C_C$—2 nanofarads
$Q_1$—2N3658 silicon controlled rectifier
$Q_2$—2N3658 silicon controlled rectifier
$R_C$—510 kilohms
R—10 megohms
$R_O$—2 ohms
$C_1$—20 nanofarads
$R_1$—1 kilohm This test setup demonstrates that fast rise time and high peak pulse magnitudes can be obtained by using various impedances as $Z_L$ with the circuit of FIG. 3. Plots of pulse waveforms obtained therefrom are seen in FIGS. 4, 5 and 6.

Figure 4:
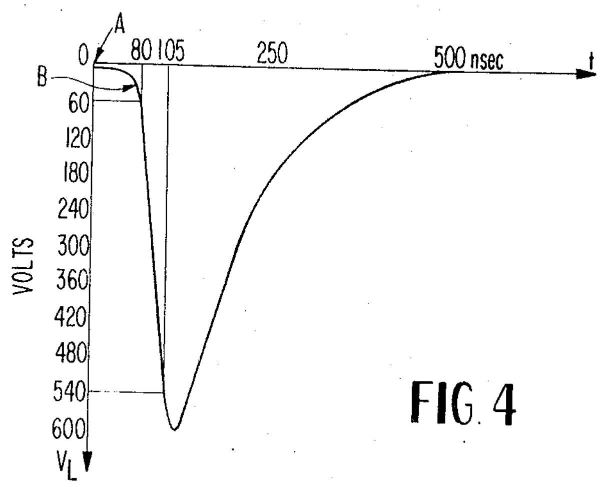
FIGS. 4, 5 and 6 are plots of pulse waveforms obtained from various load impedances connected into the pulse-generating circuit of FIG. 3.

For FIG. 4, $Z_L$ comprised a simple resistive load of 50 ohms which was connected directly to capacitor $C_C$. Moreover, each of the 2N3658 SCR's was tested and found to have a forward avalanche voltage of approximately 700 volts. The origin of time axis in FIG. 4 denotes a point in time just before appreciable current flow exists in $Z_L$. This point in time, denoted as A, is approximately ½ to 1 microsecond after a trigger pulse was applied to trigger input T. Increasing the forward voltage across SCR $Q_2$ does not tend to increase leakage current therein until the point A is reached, where avalanche multiplication begins. After point A in time, the leakage current increases quite rapidly until the total current through $Q_2$ is sufficient to raise the SCR's internal loop gain equal to or greater than unity. At this point, denoted as B, $Q_2$ enters the high conduction region or, an avalanche condition.

A rapid increase in current can be noted at point B, or, about 75 nanoseconds from the origin, culminating in a peak voltage value of 600 v. at about 110 nanoseconds. As rise time is commonly defined as the interval between 10% and 90% of the pulse peak magnitude, the rise time of the pulse of FIG. 2 can be calculate dto be 25 nanoseconds, the 10% point occurring at 80 nanoseconds and the 90% point at 105 nanoseconds. The peak pulse magnitude may be increased by increasing the value of $C_C$, holding all other component values and parameters constant.

The remainder of the pulse illustrated in FIG. 4 shows the exponentially-decreasing waveform associated with a resistive impedance $Z_L$.

Referring now to FIG. 5, the energy storage means and load $Z_L$ comprised 137 meters of coaxial cable, designated RG–58A/*u*, connected directly to the common point 12 between the anode of SCR $Q_Z$ and charging resistor $R_C$, and a 50 ohm resistor connected from the outer shield of the cable to ground. As seen from the plot in FIG. 5, initial waveshape is similar to that of FIG. 4, having a peak magnitude of 600 volts and a rise time of approximately 25 nanoseconds. The remainder of the pulse has a square waveshape, as expected.

Finally, as seen in FIG. 6, capacitor $C_C$ again comprised 2 nanofarads and $Z_L$ comprised a simple L-C network. The initial discharge through the switching means S has a waveshape similar to that of FIG. 4, with a peak pulse magnitude of −660 volts and a rise time of approximately 25 nanoseconds. Thereafter, discharge oscillated among the components of the L-C network and the distributed capacitance and resistance associated with the output impedance $Z_O$.

From the above-going description, it should be evident to those skilled in the art that a switching means for a pulse-generating circuit has been described which is capable of producing high-energy pulses having a high peak magnitude and an extremely fast rise time. These beneficial results are obtained by using conventional gate triggering for a number of SCR's comprising the switching means so that the remaining SCR's may be placed in a conducting condition by avalanche breakdown thereof.

While this invention has been described with respect to a preferred embodiment and several illustrative examples thereof, it is to be clearly understood by those skilled in the art that the invention is not limited thereto and is intended to be bounded only by the appended claims.

What I claim as new and desire to secure by Letters Patent of the United States is:

1. In a pulse-generating circuit suitable for the production of high energy pulses which includes a high voltage D.C. supply, a load impedance cross which the pulse is developed having one end connected to a source of reference potential, an energy storage means having one side coupled to the high voltage supply and the other side connected to the other end of the load impedance, the energy storage means being charged by the supply to a voltage approximately equal to that of the supply, and a semiconductor switching means for connecting the energy storage means to the source of reference potential upon closure thereof, thereby completing a discharge path through the load impedance, an improvement wherein the semiconductor switching means includes:

(a) a plurality of silicon controlled rectifiers having their cathodes and anodes connected in a series arrangement, said rectifiers being divided into first and second groups, each group comprising at least one rectifier having a characteristic forward avalanche voltage;

(b) a plurality of first resistors, each connected between the anode and cathode of a respective rectifier in the first and second group and also connected in series between said energy storage means and said reference potential source, the total number of rectifiers and resistors being such as to establish a voltage less than said forward avalanche voltage across each respective rectifier, said first resistors connected across said first group being selected such that the voltage across each first group rectifier when the second group rectifiers are placed into a conducting state is greater than said forward avalanche voltage; and (c) triggering means including a capacitor for coupling a source of trigger signals to each gate terminal of each of the rectifiers in said second group and a resistor connected between the gate and cathode terminals of each of said rectifiers in said second group, whereby placing said second group rectifiers into conduction by a trigger signal produces an avalanche condition in the first group rectifiers to close said switching means.

2. The improvement of claim 1 further comprising:

(a) a second resistor disposed between a common point of the energy storage means and of said semiconductor switching means, and the high voltage D.C. supply, said second resistor being chosen to regulate the charging rate of the energy storage means and to limit the steady state current through said silicon controlled rectifiers to a value below their holding current; and (b) a third resistor disposed between the semiconductor switching means and the source of reference potential to thereby limit the peak discharge current through each of said silicon controlled rectifiers to a value within the current-carrying capacity thereof.

3. The improvement of claim 1 wherein:

(a) each of said silicon controlled rectifiers is an equivalent type; and (b) each of said first resistors is of an equal value.

4. The improvement of claim 2 wherein:

(a) each of said silicon controlled rectifiers is an equivalent type; and (b) each of said first resistors is of an equal value.

References Cited

UNITED STATES PATENTS

| | | | |
|---|---|---|---|
| 3,135,876 | 6/1964 | Embree et al. | |
| 3,144,567 | 8/1964 | Mochlmann | 307—108 |
| 3,158,799 | 11/1964 | Kelley et al. | |
| 3,254,236 | 5/1966 | Meng. | |
| 3,268,822 | 8/1966 | Hickey | 307—263 X |
| 3,404,293 | 10/1968 | Harris et al. | 307—252 |

ROBERT K. SCHAEFER, Primary Examiner

T. B. JOIKE, Assistant Examiner

U.S. Cl. X.R.

307—252